(12) United States Patent
Kurita et al.

(10) Patent No.: US 7,420,174 B2
(45) Date of Patent: *Sep. 2, 2008

(54) NONDESTRUCTIVE INSPECTION DEVICE AND CRANE EQUIPPED WITH NONDESTRUCTIVE INSPECTION DEVICE

(75) Inventors: Koichi Kurita, Hiroshima (JP); Masanori Masumoto, Hiroshima (JP); Toshiyuki Kusano, Hiroshima (JP); Koji Uchida, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 11/029,353

(22) Filed: Jan. 6, 2005

(65) Prior Publication Data

US 2006/0027751 A1 Feb. 9, 2006

(30) Foreign Application Priority Data

Aug. 5, 2004 (JP) ............................. 2004-229573

(51) Int. Cl.
*G01F 23/00* (2006.01)
*G01N 23/04* (2006.01)
(52) U.S. Cl. ..................................... 250/358.1; 378/57
(58) Field of Classification Search .............. 250/358.1; 378/57

See application file for complete search history.

(56) References Cited

U.S. PATENT DOCUMENTS

| | | | | |
|---|---|---|---|---|
| 3,581,090 | A * | 5/1971 | Brown ................... | 250/363.01 |
| 5,754,617 | A | 5/1998 | Itoh | |
| 5,838,759 | A * | 11/1998 | Armistead ................... | 378/57 |
| 6,252,929 | B1 | 6/2001 | Swift et al. | |
| 6,420,709 | B1 * | 7/2002 | Block et al. .................. | 250/343 |
| 6,498,338 | B2 * | 12/2002 | Oosterling et al. .......... | 250/221 |
| 6,614,387 | B1 * | 9/2003 | Deadman ...................... | 342/70 |
| 7,103,137 | B2 * | 9/2006 | Seppi et al. ..................... | 378/9 |
| 2001/0030744 | A1 * | 10/2001 | Chang ..................... | 356/237.3 |
| 2002/0031202 | A1 * | 3/2002 | Callerame et al. ............. | 378/57 |
| 2002/0136353 | A1 | 9/2002 | Kang et al. | |
| 2003/0201394 | A1 | 10/2003 | Peoples | |

(Continued)

FOREIGN PATENT DOCUMENTS

DE 102 45 593 A1 5/2004

(Continued)

*Primary Examiner*—David P. Porta
*Assistant Examiner*—Mindy Vu
(74) *Attorney, Agent, or Firm*—Kanesaka Berner & Partners

(57) ABSTRACT

An object is to provide a nondestructive inspection device of a low equipment cost, and a crane equipped with the nondestructive inspection device. The nondestructive inspection device is provided for a quay crane, on a transporting route of the container. The nondestructive inspection device irradiates radiation from radiation sources to a container which has entered into an inspection area, and detects radiation that has transmitted through the container using the same detector, and nondestructively inspects the entire inside of the container based on information of intensity of the radiation and information of detection position of the radiation. The nondestructive inspection device is provided with; a modulation device which assigns different modulations to each radiation emitted from each of the radiation sources, and an identification device that distinguishes the modulation assigned to the radiation incident on the detector based on the output of the detector, and identifies which one of the radiation sources this radiation has been emitted from.

9 Claims, 2 Drawing Sheets

U.S. PATENT DOCUMENTS

2004/0156477 A1* 8/2004 Bjorkholm ................. 378/146
2006/0042397 A1* 3/2006 Kurita et al. ................. 73/800

FOREIGN PATENT DOCUMENTS

| JP | 2000-514183 | 10/2000 |
| JP | 2004-203622 | 7/2004 |
| WO | WO 95/08108 | 3/1995 |
| WO | WO98/00681 | 1/1998 |

* cited by examiner

NONDESTRUCTIVE INSPECTION DEVICE AND CRANE EQUIPPED WITH NONDESTRUCTIVE INSPECTION DEVICE

RELATED APPLICATION

The present application is based on, and claims priority from, Japanese Application Serial Number 2004-229573, filed Aug. 5, 2004, the disclosure of which is hereby incorporated by reference herein in its entirety.

BACKGROUND OF THE INVENTION

1. Field of the Invention

The present invention relates to a nondestructive inspection device and a crane equipped with this nondestructive inspection device.

2. Description of Related Art

Recently, there has been an increase in the illegal importation of suspicious items hidden inside containers. Therefore, when importing and exporting containers, especially at a container terminal of a harbor, it has become increasingly important to quickly discover and uncover the suspicious items by inspecting inside the container. Particularly from the viewpoint of decreasing inspection manpower or maintaining the status of cargoes, there has been a demand for a method which allows nondestructive inspection from outside without opening the container.

As an inspection device that nondestructively inspects for suspicious items in a container, there is for example a straddle inspection system described in Published Japanese translation No. 2000-514183 of PCT (FIG. 1, FIG. 4). This straddle inspection system has a transmission radiation source and a detector which detects radiation, installed on a straddle crane having just sufficient space to enable a container to pass in between, and by self-propelling this straddle crane to relatively move the container between the transmission radiation source and the detector, a radiographic image of the container is obtained, and the presence of suspicious items is inspected for based on this radiographic image.

Here, according to the principle of detection, the detector can detect radiation intensity, but is unable to detect the incident direction of the radiation. That is to say, in the case where radiation is irradiated to the detector from a plurality of transmission radiation sources, the detector is unable to identify which transmission radiation source the radiation has been emitted from.

Therefore, conventionally, a radiographic image is obtained by irradiating radiation to one detector only from one transmission radiation source, in order to obtain an accurate radiographic image. Moreover in the case of performing inspection over a wide range where one transmission radiation source is unable to entirely irradiate transmission radiation, or in the case where radiographic images from a plurality of directions are required, a plurality of pairs of a detector and a transmission radiation source is provided. However, since detectors are extremely expensive, the inspection device becomes extremely expensive when a plurality of detectors is provided.

Moreover, the transmission radiation source is substantially a dot shaped radiation source, and the transmission radiation generated by the transmission radiation source gradually spreads as it becomes distanced from the transmission radiation source. That is to say, since the radiographic image of the container is larger than the container, the detector becomes larger than the container.

Since in this manner a large detector is used, the conventional inspection device is extremely expensive. Furthermore, when the detector becomes larger, the detector itself deforms due to its own weight, and it becomes difficult to obtain a high precision radiographic image.

BRIEF SUMMARY OF THE INVENTION

The present invention takes into consideration the above situation, with an object of providing a nondestructive inspection device of a low equipment cost, and a crane equipped with the nondestructive inspection device.

In order to address the above problems, the nondestructive inspection device, and the crane equipped with the nondestructive inspection device, of the present invention employ following means.

That is to say, the nondestructive inspection device according to the present invention is a nondestructive inspection device which irradiates radiation from a radiation source to an inspection object, and detects radiation transmitted through the inspection object using a detector, and inspects the inside of the inspection object nondestructively based on information of intensity of the radiation and information of detection position of the radiation, wherein a plurality of the radiation sources are arranged so as to respectively irradiate the radiation to the same detector from different positions on opposite sides of an inspection area into which the inspection object enters, the nondestructive inspection device comprising: a modulation device which assigns different modulations to each radiation emitted from each of the radiation sources, and an identification device that distinguishes the modulation assigned to the radiation incident on the detector based on the output of the detector, and identifies which one of the radiation sources the radiation has been emitted from.

In the nondestructive inspection device constructed in this way, the radiation is respectively irradiated by the plurality of radiation sources from different positions, to the same detector through the inspection object. In other words, the radiation transmitted through the inspection object from different directions enters the one detector.

These radiations are respectively assigned different modulations by the modulation device for each radiation source. For the modulation device, a chopper or the like that modulates the radiation generated by the radiation source to convert the radiation which reaches the detector into a pulsed radiation of a frequency specific to the radiation source, is used.

The output of the detector when these modulated radiations enter the detector reflects the modulations assigned to the incident radiations. For example, in the case where the chopper is used as a modulation device, the output of the detector contains a frequency component at which the output fluctuates, at the same frequency as the modulation of the chopper.

The modulation assigned to the radiation that enters the detector is identified by the identification device based on this output of the detector, and which radiation source the radiation, which has entered the detector, is emitted from is identified based on the modulation information. For the identification device, for example, a lock-in amplifier or the like that takes out a signal of a frequency the same as the modulation due to the chopper from the output of the detector, is used.

Thus, in this nondestructive inspection device, the radiation emitted from a plurality of radiation sources can be separately identified for each radiation source by one detector, even if the irradiated positions overlap.

As a result, in this nondestructive inspection device, while having a construction where; a plurality of radiation sources are provided, the inspection area is set large, and the inspection object is inspected from a plurality of directions, fewer installations of expensive detectors are required compared to the conventional nondestructive inspection device, and a detector that is smaller than the one used for the conventional nondestructive inspection device can be used.

Moreover, by using a smaller detector, the deformation of the detector due to its own weight becomes smaller, and detection accuracy of the detector becomes higher.

Furthermore, the nondestructive inspection device itself becomes smaller than the conventional one.

Also, regarding the nondestructive inspection device, among the radiation sources, the radiation source which irradiates the radiation to an end part of the inspection area may be disposed in either a front facing position of the end part, or a position which is outside of the front facing position.

In the nondestructive inspection device constructed in this manner, radiation is irradiated to the end part of the inspection area from the radiation source disposed in the front facing position of this end part, or in the position outside this front facing position. That is to say, in this nondestructive inspection device, since the radiation enters the end part of the inspection area from the front facing position of the end part or from the position outside the front facing position, the size of radiographic image becomes substantially the same size of the inspection area, or becomes smaller than the size of the inspection area.

As a result, the installation cost for the nondestructive inspection device becomes low, since a detector whose size is the same as that of the inspection object or is smaller than that of the inspection object can be used.

The crane according to the present invention has the above mentioned nondestructive inspection device according to the present invention.

By providing the nondestructive inspection device according to the present invention for a crane constructed in this way, that is, a cargo handling machine such as a quay crane which performs cargo handling for vessels, or a yard crane which performs container handling at a marshalling yard where containers are kept, the inside of the container can be inspected during the cargo handling operation or transporting operation (cargo transporting operation), at low equipment cost, and if suspicious items are contained inside the container, they can be quickly and reliably discovered and uncovered without decreasing the cargo transporting efficiency.

This crane may also be a quay crane.

With a crane constructed in this way, when containers are transported between the container terminal and the vessel, container inspection can be performed using the nondestructive inspection device according to the present invention. That is to say, a suspicious container can be identified at an early stage by performing inspection of the container at the first stage of receipt at the container terminal, or the contents of the container at shipping can be guaranteed by performing the inspection of the container at the final stage of shipping from the container terminal.

According to the nondestructive inspection device of the present invention, and a crane having this, while having a construction where; a plurality of radiation sources are provided, the inspection area is set large, and the inspection object is inspected from a plurality of directions, fewer installations of expensive detectors are required compared to the conventional nondestructive inspection device, and a detector that is smaller than the one used for the conventional nondestructive inspection device can be used. As a result, the equipment cost becomes low.

Moreover, by using a smaller detector, the deformation of the detector due to its own weight becomes smaller, and detection accuracy of the detector becomes higher. As a result, nondestructive inspection can be performed with a higher degree of accuracy.

Furthermore, since the nondestructive inspection device itself becomes smaller than the conventional ones, options of installation location are many, and it can be loaded on a crane for example, and it can be operated for various applications.

DETAILED DESCRIPTION OF THE INVENTION

Figure 1:
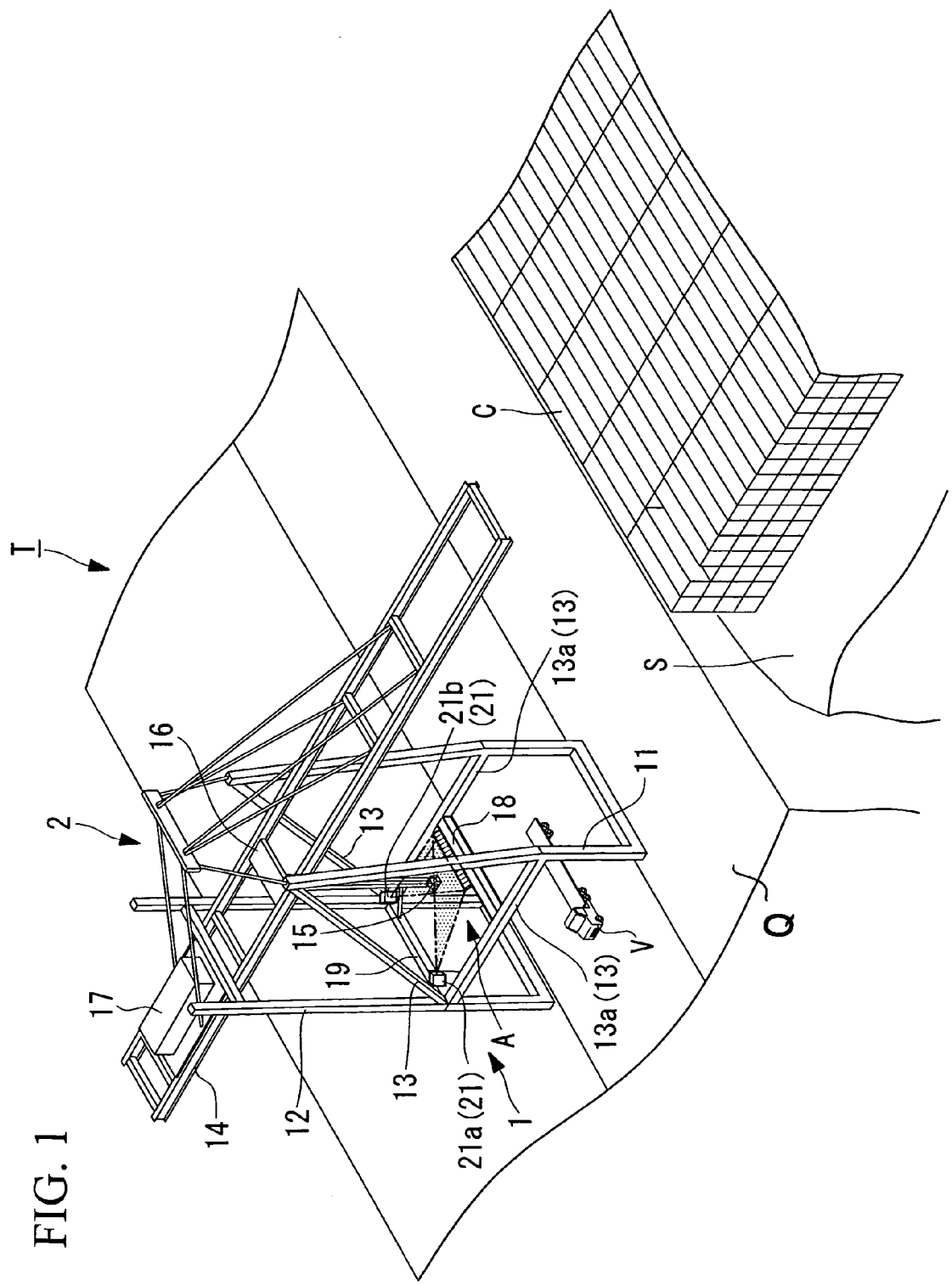
FIG. 1 is a perspective view showing the construction of a quay crane according to one embodiment of the present invention.
Figure 2:
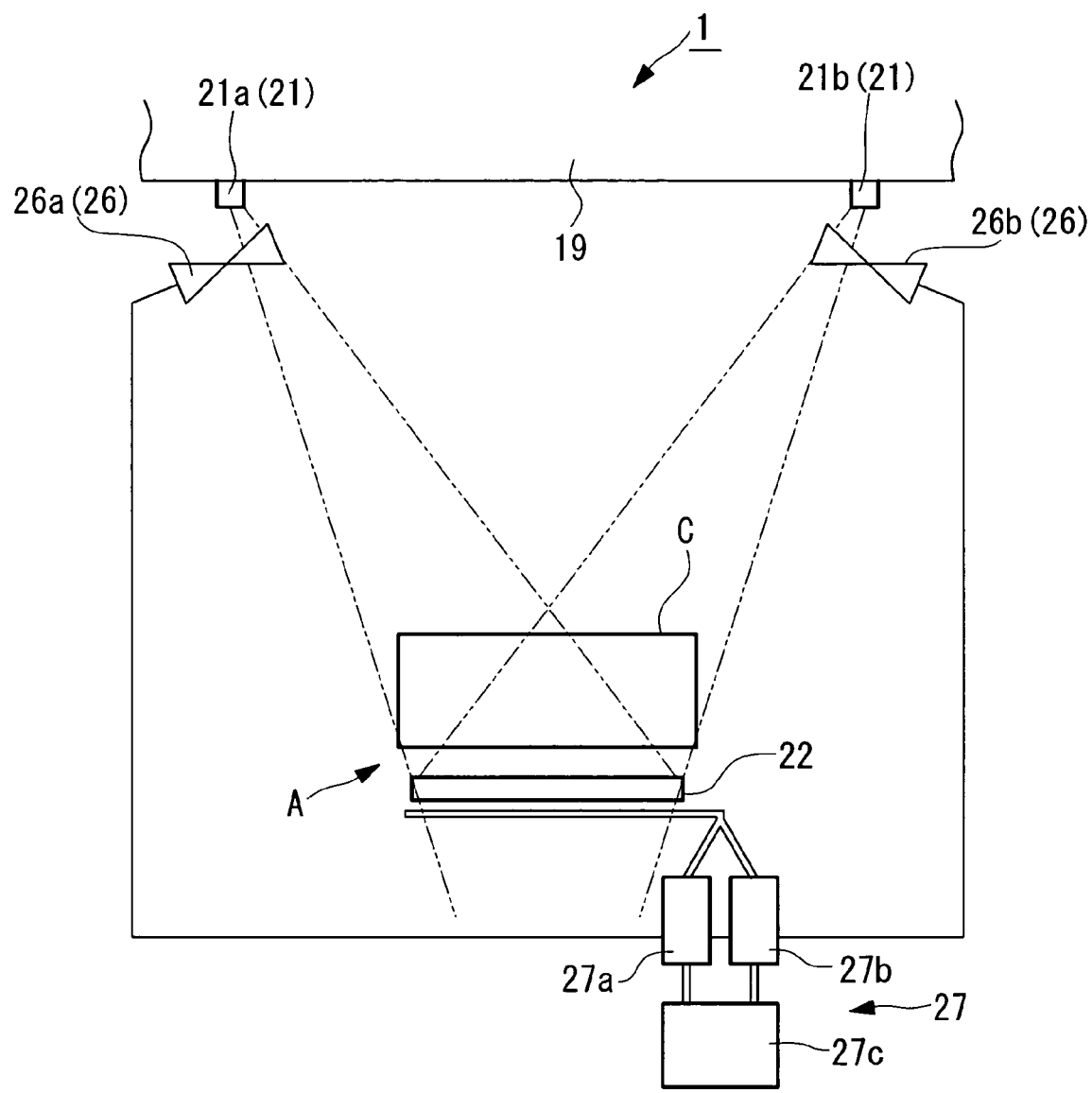
FIG. 2 is a plan view showing the construction of a nondestructive inspection device according to one embodiment of the present invention.

Hereunder, an embodiment according to the present invention is described, with reference to FIG. 1 and FIG. 2.

In the present embodiment, as shown in FIG. 1, an example is given of where a nondestructive inspection device 1 according to the present invention is installed on a quay crane 2 that performs cargo handling for a container vessel S alongside of a quay wall Q, in a container terminal T installed on a harbor section.

The quay crane 1 is constructed with a boom 14 that extends to the upper side of the container vessel, provided above front legs 11 and rear legs 12 that are mutually connected by connection members 13 and are respectively provided with wheels on their bottom ends.

The boom 14 suspends a spreader 15 that a container C is fixed onto, and is provided with a trolley 16 that can move along the boom 14, and a hoisting device 17 for winding the spreader 15 up and down. By suspending, winding up and down, and moving the container C with these, the container C is transferred between the container vessel S and a chassis V standing by below the quay crane 2.

Of the connection members 13 which connect the front legs 11 and the rear legs 12, between connection members 13a substantially horizontally provided between the front legs 11 and the rear legs 12, a beam 18, which connects these connection members 13a, is provided substantially horizontally.

Moreover, between the rear legs 12, a beam 19 which connects the rear legs 12, is provided substantially horizontally at the same height as the connection parts 13a and the beam 18. Here, these beams 18 and 19 are disposed in parallel with each other.

For this quay crane 2, a transporting route of the container C is set so as to pass the area surrounded by the connection members 13a and the beams 18 and 19. Also, for this quay crane 2, the container C is transported so that the lengthwise direction of the container C is substantially parallel with the beams 18 and 19.

The nondestructive inspection device 1 is installed within the quay crane 2, on the transportation route of the container C in an area distanced from the ground. In the present embodiment, the nondestructive inspection device 1 is installed in the region surrounded by the connection members 13a and the beams 18 and 19.

The nondestructive inspection device 1 has radiation sources 21 that emit radiation such as γ rays and X-rays, and a detector 22 disposed on either side of an inspection area A into which the container C, being an inspection object, enters between the radiation sources 21 and the detector 22.

Also, for the nondestructive inspection device 1, if necessary a protective barrier for radiation shielding is provided therearound.

The nondestructive inspection device 1 is one which irradiates radiation from the radiation sources 21 onto a container C which enters the inspection area A, and detects the radiation that has penetrated through the container C by means of the detector 22, and based on information for the intensity of the radiation detected by the detector 22 and information for the detected position, nondestructively inspects the entire inside of the container C.

For the radiation sources 21, common radiation sources such as, those that use a radioactive isotope (RI) such as $Co_{60}$ (cobalt 60), or an X-ray generation device are used.

Also, for the detector 22, a radiation detection device that is commonly used for nondestructive inspection using radiation is used.

In the present embodiment, radiation sources that use $Co_{60}$ are used for the radiation sources 21.

Moreover, a detector array comprising a multiple array of radiation detectors is used for the detector 22. The radiation detector is constructed for example, from a scintillator and a photomultiplier, wherein the scintillator converts the incident radiation into visible light, and the photomultiplier detects and converts the light generated by the scintillator into an electrical signal. The area where the radiation detectors are disposed is the detection area, and the detector array finds the incident position of the radiation within the detection area based on which radiation detector an output is obtained from, and obtains the intensity of the incident radiation based on the magnitude of the output of the radiation detector.

Hereunder, the construction of the nondestructive inspection device 1 is described in detail.

Within the quay crane 2, a radiation source 21a is installed on one of the connections for the leg 12, the connection member 13a and the beam 19, and a radiation source 21b is installed on the other one.

Moreover one detector 22 is installed at a middle part of the beam 18 so that its detection area faces the beam 19 side.

Hereunder, for this nondestructive inspection device 1, the array direction of the radiation sources 21a and 21b is the widthwise direction (lengthwise direction of the beams 18 and 19), and the direction from the beam 18 towards the beam 19 is the depthwise direction.

Regarding the radiation sources 21a and 21b, as shown by the two-dot chain lines in FIG. 2, the construction is such that the radiation is respectively irradiated towards the inspection area A so as to spread in an approximate fan shape on a substantially horizontal plane. That is to say, in this nondestructive inspection device 1, the construction is such that these radiation sources 21a and 21b respectively irradiate the radiation to the same detector 22 from different positions. Moreover, the irradiation range of the radiation from these radiation sources 21a and 21b is set to cover the entire inspection area A including the aforementioned depthwise direction. Therefore, the irradiation areas of radiation from each of the radiation sources 21a and 21b overlap.

The radiation sources 21a and 21b are respectively disposed at positions outside in the widthwise direction, from the front position of the edge part of the inspection area A, and the radiographic image of the container C is projected to the detector 22, onto an area which is smaller in the widthwise direction than the inspection area A.

The detector 22 is a detector array having a plurality of radiation detectors arrayed in the widthwise direction, and its detection area has a strip shape along the widthwise direction. Moreover, the length of the detector 22 in the widthwise direction is set to be shorter than the length of the inspection area A in the widthwise direction.

Furthermore, this nondestructive inspection device 1 is provided with a modulation device 26 which assigns different modulations to each radiation emitted from each of the radiation sources 21a and 21b, and an identification device 27 that distinguishes the modulation assigned to the radiation incident on the detector 22, based on the output of the detector 22, and identifies which one of the radiation sources 21 this radiation has been emitted from.

The modulation device 26 has; a modulation device 26a which assigns a modulation to the radiation emitted from the radiation source 21a, and a modulation device 26b which assigns a modulation to the radiation emitted from the radiation source 21b.

In the present embodiment, choppers are used as these modulation devices 26a and 26b. The choppers modulate the radiation emitted from the radiation sources 21, on the near side of the inspection area A, to convert the radiation which reaches the detector into a pulsed radiation of a frequency specific for the radiation source.

The modulation device 26a is constructed to convert the radiation emitted from the radiation source 21a into a pulsed radiation of a frequency f1, and the modulation device 26b is constructed to convert the radiation emitted from the radiation source 21b into a pulsed radiation of a frequency f2 (where f2≠f1).

The identification device 27 is provided with: a lock-in amplifier 27a which takes out from the output of the detector 22, a component which is repeated at the frequency f1 specific to the radiation source 21a; a lock-in amplifier 27b which takes out from the output of the detector 22, a component which is repeated at the frequency f2 specific to the radiation source 21b; and a computing device 27c which respectively forms a radiographic image created by the radiation emitted from the radiation source 21a, and a radiographic image created by the radiation emitted from the radiation source 21b, based on the components which these lock-in amplifiers 27a and 27b have taken out.

Nondestructive inspection of the container C that uses the quay crane 2 constructed in this way, is performed in parallel with transportation of the container C, during the process of transporting the container C along the transporting route of the quay crane 2.

Specifically, by transporting the container C and passing it through the inspection area A on the transporting route, each part of the container C from the front side in the transportation direction to the rear side in the transportation direction is sequentially exposed between the radiation sources 21 and the detector 22. The nondestructive inspection device 1 is operated in synchronization with the operation of the quay crane 2, and nondestructive inspection of the inside of the container C is performed from the bottom to the top of the container C, by the nondestructive inspection device 1.

That is to say, the quay crane 2 enables nondestructive inspection of the container C to be performed during cargo handling. Therefore inspection of the container C can be performed without decreasing the cargo transporting efficiency. Moreover, a suspicious container C can be identified at an early stage by performing inspection of the container C at the first stage on receipt at the container terminal T. Alternatively, the contents of the container C at shipping can be guaranteed by performing inspection of the container C at the final stage of shipping from the container terminal T.

Moreover, with the quay crane 2, the inspection area A of the nondestructive inspection device 1 is set on the transporting route of the container C by the quay crane 2. Therefore the space used for the inspection at the container terminal T can be reduced.

Furthermore, with the quay crane 2, the nondestructive inspection device 1 is provided at a position distanced from the ground. Therefore it is difficult for people to accidentally come close to the vicinity of the nondestructive inspection device 1. As a result, entry of people to the vicinity of the nondestructive inspection device 1 can be managed easily, thus facilitating safety management of the nondestructive inspection device 1.

Moreover, by providing the nondestructive inspection device 1 distanced from the ground, the space below the nondestructive inspection device 1 at the container terminal T can be utilized.

Hereunder, nondestructive inspection of a container C by the nondestructive inspection device 1 according to the present embodiment is described in detail.

In this nondestructive inspection device 1, radiation is respectively irradiated by the radiation sources 21a and 21b from different positions towards the same detector 22 through the container C. In other words, the respective radiations transmitted through the container C from different directions enter the one detector 22.

These radiations are respectively assigned different modulations for each radiation source by the modulation devices 26a and 26b.

The output of the detector 22 when these modulated radiations enter the detector 22 reflects the modulations assigned to the incident radiations.

In this nondestructive inspection device 1, the modulation assigned to the radiation that enters the detector 22 is identified by the identification device 27 based on the output of the detector 22, and which radiation source the radiation, which has entered the detector 22, is emitted from is identified based on the modulation information.

More specifically, the lock-in amplifier 27a extracts from the output of the detector 22, the signal repeated at frequency f1, and based on this extracted signal, the computing device 27c forms a radiographic image of the container C created by the radiation emitted from the radiation source 21a.

In the same way, the lock-in amplifier 27b extracts the signal repeated at frequency f2, and based on this extracted signal, the computing device 27c forms a radiographic image of the container C created by the radiation emitted from the radiation source 21b.

Thus, in this nondestructive inspection device 1, one detector 22 can separately identify for each radiation source, radiation irradiated from each of the radiation sources 21a and 21b, whose irradiation positions are overlapping.

As a result, in this nondestructive inspection device 1, while providing two radiation sources 21 and setting the inspection area A large, only one detector 22 needs to be installed, and the number of installed expensive detectors 22 can be minimized compared to a conventional nondestructive inspection device.

Furthermore, the radiation sources 21a and 21b are respectively disposed at positions outside in the widthwise direction, from the front position of the edge part of the inspection area A, and the radiographic image of the container C is projected to the detector 22, onto an area which is smaller in the widthwise direction than the inspection area A.

Therefore, the entire length of the detector 22 can be made shorter than the width of the container C, and the facility cost is made lower.

Further, the nondestructive inspection device 1 itself becomes smaller than the conventional one.

Also, in this way, by using a smaller sized detector 22, deformation of the detector 22 due to its own weight becomes small, so that the detection accuracy of the detector 22 becomes high, and a clearer radiographic image can be obtained. Therefore, inspection at a higher degree of accuracy becomes possible.

Moreover, in the nondestructive inspection device 1, since the radiation is irradiated from two different directions to the inspection region A, radiographic images of the container C from two different directions are obtained. That is to say, in this nondestructive inspection device 1, while having one detector 22 installed, information for the depthwise direction of the container C can also be obtained, by inspecting the container C from two different directions.

As a result, with the nondestructive inspection device 1, while keeping down the installation cost, it becomes possible to discover abnormalities which would have been missed in inspection from one direction, so that inspection at a higher degree of accuracy can be performed.

Furthermore, in the embodiment, the detector 22 is constructed having a scintillator which converts the incident radiation into visible light, and a photomultiplier which detects the visible light generated by the scintillator and converts it into an electrical signal, and detects the radiation intensity based on the output of the photomultiplier. However, the invention is not limited to this and another construction may be employed as the construction of the detector 22. For example, for the detector 22, instead of the scintillator, a semiconductor detection element such as a Si (silicon) radiation detection element or a CdTe (cadmium telluride) radiation detection element can also be applied. Moreover, also for the method of detecting the signal obtained by the detector 22, the invention is not limited to the method that uses a lock-in amplifier, and it may be constructed to detect the radiation intensity by using for example a photon counter in a lock-in mode.

Furthermore, in the embodiment described above, an example of a nondestructive inspection device 1 according to the present invention installed on a quay crane is shown. However, in the invention it is not limited to this, and the nondestructive inspection device 1 may be installed on another crane such as a yard crane that is used in the container terminal T, or the nondestructive inspection device 1 may be installed alone.

What is claimed is:

1. A nondestructive inspection device that radiates penetrative radiation from a radiation source to an inspection object, detects penetrative radiation transmitted through said inspection object using a detector, and nondestructively inspects an inside of said inspection object based on information of intensity of said penetrative radiation and information of detection position of the penetrative radiation, wherein a plurality of radiation sources that emit penetrative radiations are arranged so as to respectively radiate said penetrative radiations to said detector from different positions on opposite sides of an inspection area into which said inspection object enters, said plurality of radiation sources irradiate the detector from different directions so that irradiated areas overlap each other; and, the nondestructive inspection device comprising:

a modulation device that assigns different modulations to each penetrative radiation emitted from each of said radiation sources, and an identification device that distinguishes the modulations assigned to the penetrative radiations incident on said detector based on output of said detector, and identifies the radiation of each penetrative radiation source incident on the detector.

2. A nondestructive inspection device according to claim 1, wherein among said radiation sources, said penetrative radiation source which radiates said radiation to an end part of said inspection area is disposed in either a front facing position of said end part, or a position which is outside of said front facing position.

3. A crane having the nondestructive inspection device according to claim 1.

4. A crane according to claim 3, wherein said crane is a quay crane.

5. A nondestructive inspection device, comprising:
   a plurality of radiation sources spaced apart from each other and arranged to radiate penetrative radiations to an inspection object,
   a detector configured to detect the penetrative radiations transmitted through said inspection object in order to nondestructively inspect an inside of said inspection object, said detector having a size less than a distance between the radiation sources situated adjacent to each other and being disposed between the radiation sources situated adjacent to each other,
   a modulation device configured to provide different modulations to the respective penetrative radiations emitted from the radiation sources, and
   an identification device that distinguishes the modulations assigned to the penetrative radiations incident on said detector based on an output of said detector, said identification device identifying the radiation sources irradiating the detector,
   said radiation sources being arranged so that said penetrative radiations radiate different areas of the detector and the irradiated areas overlap each other.

6. A nondestructive inspection device according to claim 5, wherein said detector has the size such that the radiations ejected from the penetrative radiation sources spaced apart from each other are entirely received by the detector at a same time through the inspection object.

7. A nondestructive inspection device according to claim 6, wherein each of said radiation sources irradiates penetrative radiations to a part of the inspection object.

8. A nondestructive inspection device according to claim 6, wherein said penetrative radiation sources are spaced apart from each other with a distance greater than the size of the detector so that the radiation ejected from each of the penetrative radiation sources only covers a part of the inspection object.

9. A crane comprising said nondestructive inspection device according to claim 5.

* * * * *